Aug. 15, 1961  J. F. McCASHEN  2,996,022
METHOD OF MAKING A COHESIVE MIXTURE OF A LIQUID AND SOLIDS
Filed Sept. 17, 1958
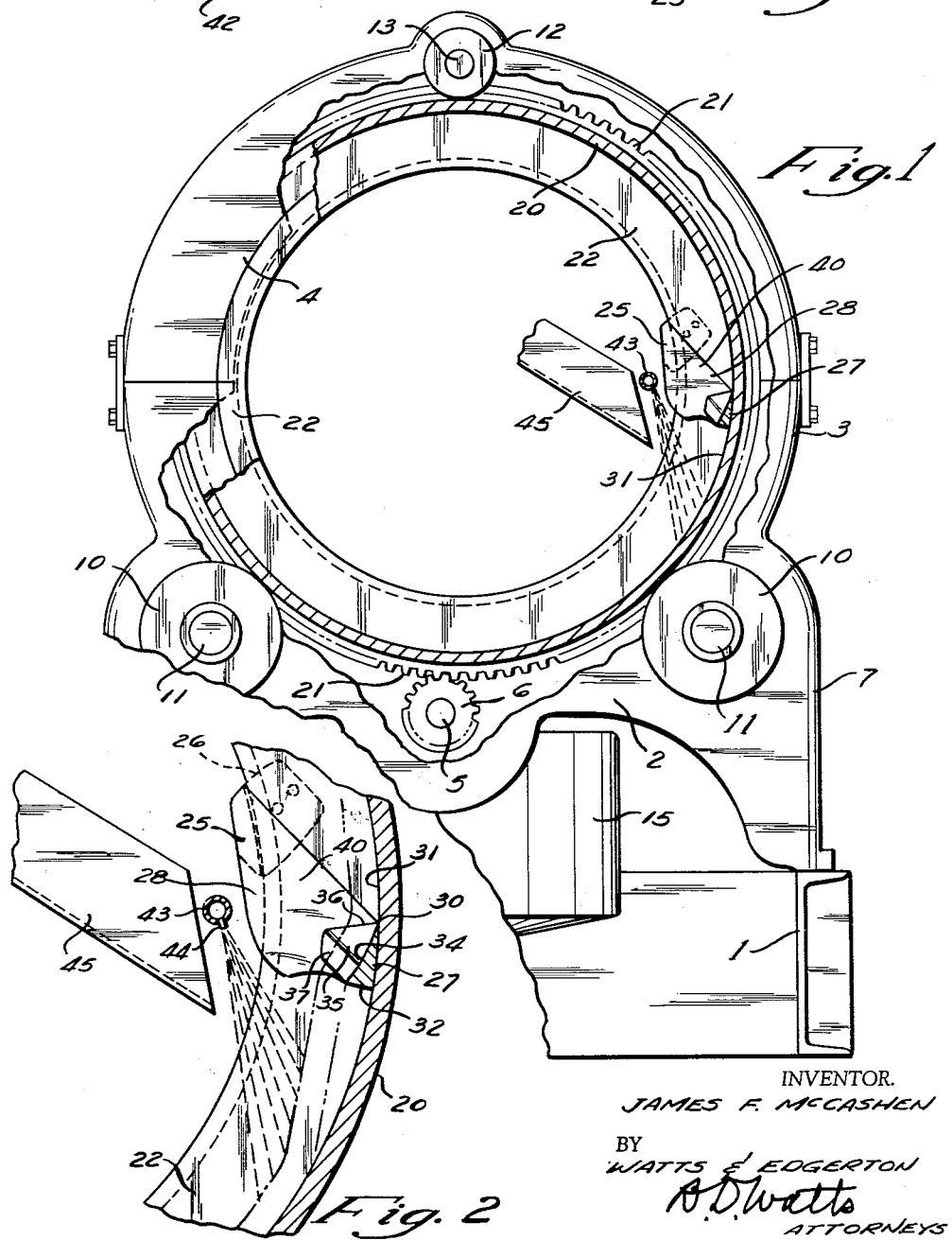
INVENTOR.
JAMES F. McCASHEN
BY
WATTS & EDGERTON
A.D.Watts
ATTORNEYS

2,996,022
METHOD OF MAKING A COHESIVE MIXTURE OF A LIQUID AND SOLIDS
James F. McCashen, 19030 W. Lake Road, Cleveland 16, Ohio
Filed Sept. 17, 1958, Ser. No. 761,611
11 Claims. (Cl. 107—54)

This invention relates generally to the art of mixing solids and liquids and is more particularly concerned with a new method of making white flour dough.

Heretofore, white flour dough has been made by adding water slowly to a large quantity of flour and a suitable quantity of yeast in a bowl or drum having a water jacket and mixing these materials by means of mixers such as paddles, drums or rollers while running cooling liquid through the jacket to remove the heat created by friction during the mixing. After the mixing action had been carried on until the mixture had attained a coherent, sticky, dough-like consistency, the dough was allowed to ferment for a predetermined length of time during which its temperature was controlled. When the dough was to be a sponge dough, part of the flour, yeast and water were mixed as just described and, after such fermentation, the dough was returned to the bowl or drum where the remainder of the flour and water and other ingredients, such as salt, shortening, sugar, milk powder, and the like, were added and mixed. After such mixing the dough was placed in baking pans, was proofed and baked. When a straight dough was desired all the flour, yeast and water and the other ingredients were mixed in the bowl or drum and thereafter the dough fermented, as just described, and was then placed in baking pans, proofed and baked.

That method of making dough is expensive because it necessitates refrigeration which requires the expenditure of power; it is slow because it depends on the mixing effects of the mixers; it does not result in a uniform mixture because the mixers cannot be depended on to mix each increment of water with each increment of flour in the same ratio; and the maximum amount of water which can be incorporated in the dough and retained in the baked loaf does not exceed about 64 pounds per 100 pounds of flour. Water which is absorbed by the protein, gluten and starch will be retained during baking, but water which is not absorbed, but is on the surface of the starch cells, will be driven off during baking.

The present invention is predicated on a fundamentally new principle of mixing ingredients which form a coherent, sticky mass. According to that principle solid and liquid ingredients are mixed to form a thin, substantially continuous layer which moves in a circular path and which is repeatedly deflected from that path and returned to it. During such travel the layer is subjected to centrifugal, compression and tension forces and may be split longitudinally and rolled transversely upon itself.

When the present invention is employed to make a white flour dough, wheat flour, made from wheat and containing the usual amounts of protein, gluten and starch, is mixed with other solid ingredients and water by discharging a stream of the solids into a fine spray of water and the resulting mixture is collected as a substantially continuous layer on a continuous circular surface rotating at a sufficiently high lineal speed for the resulting centrifugal force to cause the layer to rotate with that surface. As successive portions of the layer pass a predetermined point in its path, each portion is deflected inwardly by a deflector and then returned to the rotating surface and these operations are continued until a dough of the desired consistency is obtained. When a portion of the layer which is traveling at a high speed comes into contact with the deflector the speed of that portion is reduced by the adherence of the sticky mass to the deflector and such retardation results in the application of compression forces to the part of the portion on the deflector.

When the leading end of the deflected portion extends from the deflector thru the air and into reengagement with the rotating surface, it adheres to that surface and its velocity is instantly accelerated. The result of the adherence of the sticky material to the deflector which slows its velocity and to the rotating surface which increases its velocity is the application of tensile forces to the part of the mass which is in the air between the deflector and the rotating surface. This force stretches that part of the mass.

When this new principle of mixing is applied to the making of white flour dough so little friction is created that no appreciable rise in temperature of the mixture occurs. Hence the mixing device need not be refrigerated and the power required for cooling the prior dough mixers is saved. Moreover, the resulting dough is quite uniform as a result of the commingling of successive small amounts of solids and water and hence the non-uniformity of doughs made by prior dough mixers is avoided. A new and surprising result of the application of this new mixing principle to the making of white flour dough is that the dough absorbs, and retains in the baked loaf, as much as 75 pounds or more of water per 100 pounds of white flour as contrasted with not more than 64 pounds of water per 100 pounds of flour when the dough is mixed in a conventional mixer. The practical importance and effect of this increase in weight of water so absorbed and retained is that an additional loaf of bread can be made for every pound of water so retained in excess of 64 pounds. In other words, 100 pounds of white flour made into dough by this invention and containing 75 pounds of water will produce eleven more one pound loaves of bread than when made into dough by prior methods and containing 64 pounds of water.

The reason why white flour dough made in this manner absorbs and retains this larger amount of water is not thoroughly understood. However, it is believed to be traceable to the combined effects of the several forces which act on the dough during the mixing process. Centrifugal force is constantly applied to the layer of the dough while it is being moved in the circular path and the application of this force begins when the first of the ingredients come into contact with the moving surface and continues until the making of the dough is completed. It is believed that this centrifugal force plays an important part in causing the water to enter the water absorbing parts of the flour, such as the cells of protein, gluten and starch.

Compression force is applied to each of the successive portions of the ingredients or layers at one place in the path of travel of the material when the speed of each portion is slowed by adherence to the fixed deflector and the following faster moving portion applies pressure to the slower moving portion on the deflector. When any given portion of the layer is intercepted by the deflector both centrifugal and compression forces are applied to that portion. It seems probable that both of these forces act together to force the water to enter the water absorbing parts of the flour.

When a portion of the layer is stretched in the air between the deflector and the rotating surface therebeyond, both centrifugal and tensile forces are applied to that portion of the layer. It is believed that during this stretching operation the water absorbing parts or cells are stretched, deformed, opened up and/or ruptured so that absorbtion of water by those parts or cells is expedited and increased.

As a result of subjecting these dough making ingredients to this process and causing the mixture to absorb more water, more loaves of bread can be obtained from a given quantity of flour, as has been pointed out above. Moreover, bread baked from white flour dough made by this process, as contrasted with bread baked from white flour dough made in the conventional manner, retains its moisture and freshness longer and has a different, distinctive and exceptionally pleasing taste and flavor. It is believed that this longer freshness and different taste and flavor are traceable in large part to the mixing operation. The rapidity of mixing without any appreciable rise in temperature seems to have a beneficial effect on the yeast in that the enzymes have great activity in acting on the other materials of the mixture. Moreover, the rapidity of mixing relatively small batches of dough permits each batch to be placed into pans, fermented and placed in the oven more quickly than when the batches of dough several times as large are made by the conventional mixers.

A preferred form of apparatus to be used in carrying out the present invention is shown somewhat diagrammatically in the drawings accompanying and forming a part of this specification in which:

FIG. 1 is a side elevational view of a device which has been found to be satisfactory for use in making flour dough.

FIG. 2 is an enlarged fragmentary partly sectional view showing the deflector, water sprayer and flour feeder in their approximate relative positions; and FIG. 3 is an enlarged top plan view of the deflector shown in FIG. 1.

The apparatus shown in FIGS. 1, 2 and 3 comprises a base 1 on the top of which a housing is secured. This housing includes a cylindrical part 3 which has inwardly extending, radially short, parallel flanges 4 and legs 7 which support the cylindrical portion on base 1.

A drive shaft 5 is journalled in the housing 2 preferably on the vertical center line and below the inner surface of the cylindrical part 3 of the housing and one, but preferably two, axially spaced gears 6 are keyed to this shaft. Supporting rollers 10 are rotatably mounted on fixed shafts 11 which are parallel to shaft 5. Shafts 10 are disposed on opposite sides of shaft 5 and are approximately 120° apart and are located substantially equidistant from the vertical center line passing through the shaft 5. One or more hold-down rollers 12 are mounted on a shaft 13 positioned on the vertical center line of housing 2.

A motor (not shown) is positioned within housing 15 beneath the cylindrical part 3 of housing 2 and the rotor shaft of that motor is connected in any suitable manner with shaft 5 to rotate the latter.

A drum 20 is mounted within the cylindrical part 3 of housing 2 and between side flanges 4 of the latter. This drum 20 is cylindrical, rests on rollers 10, is held down on those rollers by rollers 12 and is provided with a cylindrical rack 21 to engage with gear 6. In the event that two gears 6 are employed to rotate drum 20, a cylindrical rack 21 is provided for each of these gears. Drum 20 has flanges 22 at its ends which are long enough radially to extend inwardly in close proximity to, beyond and outwardly over the inner edges of flanges 4 of the housing.

Guide rollers (not shown) may be carried by the housing on opposite sides of the latter and adjacent to rollers 10 and may be adjusted toward and away from drum 20 so as to vary the distance between them and flanges 22 and thereby locate, and regulate the amount of endwise movement of the drum 20 in the housing.

A mixer 25 is supported by the flanges 4 of the housing. This mixer is better shown in FIGS. 2 and 3 and is substantially U-shaped with oppositely extending arms 26 by which the mixer may be secured to the housing and a deflector 27 to be fixed in predetermined position with respect to the inner surface of drum 20. From arms 26 side members 28 extend toward the inner circumferential surface of drum 20 and these side members are connected by deflector 27.

Deflector 27 has a leading edge 30 which is thin and the mixer is so dimensioned that this edge will lie close to the inner surface 31 of drum 20. The deflector 27 increases in thickness from its edge 30 to its trailing side 32 and its inner surface curves inwardly; that is, away from the inner surface 31 of drum 20. For use with a drum 20 which is approximately 42 inches in diameter, the trailing end 33 of the inner surface 34 of deflector 27 is preferably about one inch from the inner surface 31 of drum 20.

At approximately the mid-part of deflector 27, a slitter 35 projects from inner surface 34 at right angles to edge 30. This slitter 35 is narrow along its leading edge 36 and, near its trailing side, its sides diverge laterally to form surfaces 37. Sides 28 of the mixer 25 have inner surfaces 40 which extend rearwardly from surface 34 and inwardly toward each other, as is indicated at 42 in FIG. 3. The slitter 35 may be omitted when it is not desired to split the layer of the dough longitudinally.

A tube 43 is positioned between the flanges 22 of the drum and is provided with a plurality of outlets 44 through which fine streams of water may be sprayed through the air toward the inner surface 31 of the drum and into the path of fine solids flowing down the inclined chute 45. Pipe 40 is connected with a source of water and chute 45 is connected to a hopper into which the flour to be mixed in the dough may be placed. Preferably the calculated amounts of water and flour are placed in their receptacles before the making of the dough is started and also preferably the rates of feed of both the water and the flour are regulated so that each will take approximately the same length of time to flow into the drum.

When the dough is to be discharged from the drum, any conventional scraper (not shown) may be brought into contact with the surface 31 of the drum to dislodge the dough therefrom and conduct it out thru the end of the drum.

It is to be understood that the illustrated apparatus has been shown for the purpose of providing apparatus by which the present method may be carried out and that many variations of that apparatus or of its parts may be made.

The operation of the apparatus just described in carrying out the present invention in making white flour dough will be readily understood by those skilled in the following art from the brief description.

The drum 20 is rotated in the housing and the water spray is started, followed promptly by the flow of the flour and any other desired solids in a small stream into the spray. The speed of rotation of the drum is such that the centrifugal force which is applied to the ingredients as they strike the inner surface of the drum is sufficient to cause them to form a layer on surface 31 of drum 20. The thickness of this layer is determined by the amounts of solids and water which are brought into the drum. During the rotation of the drum each successive part of the layer engages the mixer 25. The surface 34 of the mixer deflects the layer inwardly away from surface 31 of the drum. Slitter 36 divides the layer longitudinally midway between its side edges into two separate bands and tends to roll the opposed edges away from each other while surfaces 40 of sides 28 engage the remote side edges of the cylindrical bands and roll them inwardly. Both of these bands are then returned to inner surface 31 where they are subjected to centrifugal force with resultant lateral spreading of the bands and reuniting of the bands along their adjacent edges and the resultant reestablishment of a single layer. This operation is applied repeatedly to the entire layer and until the dough is of the desired consistency. As a result of slitting and rolling the mid-portion of the layer upon itself and rolling the outer end portions of the layer inwardly upon itself, the layer is increased in radial thickness and decreased in axial length. This repeated slitting and rolling effectively mixes the ingredients of the layer. When the dough has been made, it is discharged from the drum, as described above, and the apparatus is ready to be used to make another batch of dough. If and when the slitter 35 is omitted from the deflector, the above described action takes place with the exception that the layer is not split longitudinally into bands which are then reunited.

It has been found that white flour and water can be mixed to form a substantially uniform, coherent dough of satisfactory consistency and containing 75 pounds or more of water per 100 pounds of flour when the drum is about 42" in diameter, is rotated at about 140 r.p.m., and is equipped with a mixer which is about 4" in width from leading to trailing edge and is thick enough at its trailing edge to move the layer of flour and water from about 2" to 2½" inwardly from the inner surface of the drum. In about 4 minutes mixing time the flour and water in the ratio of 100 pounds to 75 pounds may be mixed into a dough satisfactory for fermentation under the foregoing conditions. Smaller size apparatus may likewise be used. For example, a mixer having a drum 17" in diameter and a speed of 140 r.p.m. may be used to make a satisfactory dough from white wheat flour and water in the ratio of 100 pounds to 75 pounds with a mixer which is about 1" wide and moves the layer of flour and water about 1½" inwardly from the inner surface of the drum, but a longer mixing time is required to make a satisfactory dough.

It will be understood by those skilled in the art from the foregoing illustrations that machines of different sizes may be built which will operate satisfactorily to make a substantially uniform dough containing more water per pound of flour than is possible with present mixing methods. Moreover it is to be understood that apparatus other than that above described may be used to carry out the present invention for it is not restricted to any particular apparatus.

The present method is applicable to the mixing of any liquid with any finely divided solid which is wettable by the liquid and which when wet, will form a coherent mass. Succinctly stated, this method consists in bringing small increments of the solid and liquid in rapid succession into a drum rotating about a horizontal axis and forming a substantially continuous cylindrical layer of these commingled materials on the inner surface of the drum. During the time the layer is being formed and until it has attained the desired consistency, it is rotated in a circular path, it is constantly subjected to centrifugal force due to the rotational speed of the drum and layer, and at a predetermined place in the circular path of the layer it is diverted inwardly and then returned to the inner surface of the drum. This operation may be carried out by omitting the slitter 35 from the deflector. Also, if desired, when the layer is being deflected it may be split into bands longitudinally between its remote side edges and the edges formed by the splitting and the side edges may be folded in upon the remaining parts of the bands. The thus treated bands are reunited into a layer upon being returned to the inner surface of the drum.

It will be understood that the present invention may be used to convert into a cohesive, substantially uniform mixture, liquids and finely divided solids which are wettable thereby and which become cohesive when so wetted. While this invention is thus capable of use with a wide variety of solids and liquids, it is particularly advantageous in connection with solids having cells into which the liquid does not readily penetrate but into which the liquid may be caused to penetrate by being subjected to the forces created by carrying out the above described steps. While white flour made from wheat has been used hereinabove in a specific description of the present invention, it is to be understood that the present invention is not limited thereto but, is susceptible of use in making soft doughs for sweet rolls and the like and also for making soft or thin batters for cakes, pastries and the like.

Having thus described this invention in such full, clear, concise and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. The method of making a cohesive mixture of a liquid and solids which comprises the steps of bringing together successively increments of a liquid and fine solids capable of being wetted and rendered cohesive thereby and forming them into a substantially continuous layer, moving said layer in a circular path about a substantially horizontal axis while subjecting it to centrifugal force, diverting said layer inwardly away from said path as it passes a predetermined place in said path and returning the layer to said path, and continuing the said diverting steps until the layer has attained the desired consistency.

2. The method of making a cohesive mixture of a liquid and solids which comprises the steps of bringing together successively increments of a liquid and fine solids capable of being wetted and rendered cohesive thereby and forming them into a substantially continuous layer, moving said layer in a circular path about a substantially horizontal axis while subjecting it to centrifugal force, diverting said layer inwardly away from said path as it passes a predetermined place in said path and simultaneously increasing the thickness of the layer and decreasing its width, and returning the layer to said path, and continuing the said mixing and diverting steps until the layer has attained the desired consistency.

3. The method of making a cohesive mixture of a liquid and solids which comprises the steps of bringing together successively increments of a liquid and fine solids capable of being wetted and rendered cohesive thereby and forming them into a substantially continuous layer, moving said layer in a circular path about a substantially horizontal axis while subjecting it to centrifugal force, diverting said layer inwardly away from said path as it passes a predetermined place in said path rolling the remote edges of said layer transversely thereof, returning the layer to said path, and continuing the said mixing and diverting steps until the layer has attained the desired consistency.

4. The method of making a cohesive mixture of a liquid and solids which comprises the steps of bringing together successively increments of a liquid and fine solids capable of being wetted and rendered cohesive thereby and forming them into a substantially continuous layer, moving said layer in a circular path about a substantially horizontal axis while subjecting it to centrifugal force, diverting said layer inwardly away from said path as it passes a predetermined place in said path and slitting said layer lengthwise into bands, returning the bands to said path, and continuing the said mixing and diverting steps until the bands have been reunited into a layer and it has attained the desired consistency.

5. The method of making a cohesive mixture of a liquid and solids which comprises the steps of bringing together successively increments of a liquid and fine solids capable of being wetted and rendered cohesive thereby and forming them into a substantially continuous layer, moving said layer in a circular path about a substantially horizontal axis while subjecting it to centrifugal force, diverting said layer inwardly away from said path as it passes a predetermined place in said path and slitting said layer lengthwise into bands and rolling the adjacent and the remote edges of said bands transversely thereby increasing the radial thickness and decreasing the transverse width of the bands, returning the layer to said path and reuniting the bands along their opposed edges, and continuing the said mixing, slitting, rolling, diverting and reuniting steps until the layer has attained the desired consistency.

6. The method of making a white flour dough which comprises the steps of feeding white flour into a water spray, forming the mixture of flour and water into a substantially continuous layer, moving said layer in a circular path about a substantially horizontal axis while subjecting it to centrifugal force, diverting said layer inwardly away from said path as it passes a predetermined place in said path, returning the layer to said path, and continuing the said mixing and diverting steps until the layer has attained the desired consistency.

7. The method of making white flour dough which comprises the steps of feeding a stream of white flour into a stream of water, forming the flour and water into a substantially continuous layer on a cylindrical surface, moving said layer and surface in a circular path about a substantially horizontal axis while subjecting the layer to centrifugal force, diverting said layer inwardly away from said surface a predetermined place in said path by engaging a deflector thereby applying compression forces to the deflected part of the layer, and returning the layer to said surface through the air while in contact with the deflector and thereby applying tension forces to the part of the layer in the air, and continuing the said mixing and diverting steps until the layer has attained the desired consistency.

8. The methods set forth in claim 7 in which the layer is slitted lengthwise to form bands while being diverted and reuniting the bands after being so diverted.

9. The method set forth in claim 7 in which the layer is slitted lengthwise to form bands and the adjacent edges are rolled away from each other while the layer is being diverted and thereafter reuniting the bands along said edges.

10. The method set forth in claim 7 in which the remote edges of the layer are rolled transversely toward each other while the layer is being diverted.

11. The method set forth in claim 7 in which the layer while being diverted is slitted lengthwise into bands, the adjacent edges are rolled transversely away from each other, the remote edges are rolled transversely toward each other and the bands are reunited along their adjacent edges thereafter.

References Cited in the file of this patent

UNITED STATES PATENTS

| | | |
|---|---|---|
| 774,680 | Lynds | Nov. 8, 1904 |
| 1,207,143 | De Francisci | Dec. 5, 1916 |
| 1,790,347 | Hawkins | Jan. 27, 1931 |
| 2,243,384 | Lehrecke | May 27, 1941 |
| 2,726,068 | Howden | Dec. 6, 1955 |
| 2,838,290 | Simpson | June 10, 1958 |